(12) United States Patent
Gu (10) Patent No.: US 7,200,283 B2
(45) Date of Patent: Apr. 3, 2007

(54) APPARATUS AND METHOD FOR ALPHA BLENDING OF DIGITAL IMAGES

(75) Inventor: Jin-Ming Gu, Cupertino, CA (US)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 0 days.

(21) Appl. No.: 11/382,682

(22) Filed: May 10, 2006

(65) Prior Publication Data

US 2006/0192696 A1    Aug. 31, 2006

Related U.S. Application Data

(62) Division of application No. 10/190,450, filed on Jul. 3, 2002, now Pat. No. 7,095,906.

(51) Int. Cl.
G06K 9/36      (2006.01)
G09G 5/00      (2006.01)

(52) U.S. Cl. ..................... 382/284; 345/629

(58) Field of Classification Search ........... 382/162, 382/284, 305; 345/537, 592, 629, 431, 418, 345/574; 708/100, 490
See application file for complete search history.

(56) References Cited

U.S. PATENT DOCUMENTS

| | | | | |
|---|---|---|---|---|
| 4,727,365 A | * | 2/1988 | Bunker et al. | ............. 345/427 |
| 5,517,437 A | * | 5/1996 | Yamashita et al. | .......... 708/490 |
| 5,568,167 A | * | 10/1996 | Galbi et al. | ................. 348/589 |
| 5,798,767 A | * | 8/1998 | Poole et al. | ................ 345/604 |

* cited by examiner

Primary Examiner—Kanjibhai Patel
(74) Attorney, Agent, or Firm—Thomas, Kayden, Horstemeyer & Risley (57) ABSTRACT

In the present invention, an apparatus and method for performing alpha blending calculations in a fast and efficient manner is disclosed. When implemented as an integrated circuit, the apparatus of the present invention occupies reduced area. The apparatus comprises a plurality of multiplexers and an adder. Each of multiplexers is configured to receive a bit value, $\alpha_i$, of the digital value alpha, $\alpha$. Each of the plurality of multiplexers is configured to receive the first and second digital image values. Each of the plurality of multiplexers is also configured to direct to outputs of the multiplexers either the first or second digital image value responsive to the bit value, $\alpha_i$. Each of the outputs of the plurality of multiplexers is shifted left according to the order of the bit values, $\alpha_i$, to produce a plurality of left-shifted outputs. The adder is produces the sum of the left-shifted outputs.

7 Claims, 7 Drawing Sheets

APPARATUS AND METHOD FOR ALPHA BLENDING OF DIGITAL IMAGES

CROSS REFERENCE TO RELATED APPLICATION

This application is a divisional of U.S. patent application Ser. No. 10/190,450, filed on Jul. 3, 2002, entitled "APPARATUS AND METHOD FOR ALPHA BLENDING OF DIGITAL IMAGES," and now U.S. Pat. No. 7,095,906 B2.

FIELD OF THE INVENTION

The present invention relates to the field of image processing. More particularly, the present invention relates to blending two sources of image data to form a resulting image.

BACKGROUND OF THE INVENTION

A digital image is made up of many pixels that are represented in a computer system as digital values. The pixels are typically arranged in columns and rows such that the collected pixels form images to be perceived by a user. Pixels can be displayed as color or gray-scale images (also called black and white images). In a gray-scale image, each pixel is represented by a luminance (also called intensity) value. For example, where luminance is expressed using eight digital bits, each pixel is represented by a single unsigned byte with a range of 0 to 255, where 0 specifies the darkest pixel, 255 specifies the brightest pixels, and intermediate values specify intermediate luminance. Moreover, images can be represented in color format wherein chrominances and luminances are specified. Chrominance (or color) can be represented using a collection of colors that when mixed together generate a perceived color. For example, the colors red (R), green (G), and blue (B) can be used to display many different colors. Depending on the chromatic content of the individual colors, a color gamut is available from which colors can be generated.

Digital image technology finds many applications including television, video and computer graphics. In these types of applications, it can be straightforward to display any given image; however, many possibilities exist when it becomes necessary to display two or more images over the same display area. Whereas to display either of two images as if it were placed on top of the other can be a simple task, it can, however, be the case that a mix or blending of the images is necessary. In the field of art to which it pertains, this mixing or blending is often achieved through a technique called alpha blending. Through the use of alpha blending, two or more images can be individually displayed, but can also be partially displayed with one image dominating the other.

In computer graphics applications, for example, in computer games, blending of images is very important, however, for complex or fast-paced graphics, alpha blending calculations can become computationally intensive. In certain applications, a screen can contain millions of individual pixels where each pixel must be refreshed every $1/60^{th}$ of a second. Moreover, many or all such pixels may require alpha blending calculation. Thus, there is a need for a method for fast alpha blending calculations in systems incorporating complex digital graphics. There is a further need for an apparatus that can produce fast alpha blending calculations through reduced hardware or reduced complexity hardware, software, or firmware.

SUMMARY OF THE INVENTION

The present invention discloses an apparatus and method for performing alpha blending calculations in a fast and efficient manner. Moreover, when implemented as an integrated circuit, an apparatus according to the present invention occupies reduced chip area. In an embodiment of the invention, an apparatus is disclosed for performing alpha blending calculations on a first digital image value, X, and a second digital image value, Y, according to a digital value, alpha ($\alpha$), that approximates the quantity, $\alpha X+(1-\alpha)Y$. The $\alpha$ value has a fractional part of n digits, a most significant bit of $\alpha_1$, and a least significant bit of $\alpha_{n-1}$, wherein the order of $\alpha_i$ is related to i. The apparatus comprises a plurality of multiplexers and an adder. Each of the plurality of multiplexers is configured to receive a corresponding bit value, $\alpha_i$, of the digital value $\alpha$. Moreover, each of the plurality of multiplexers is configured to receive the first and second digital image values. Still further, each of the plurality of multiplexers is configured to direct to outputs of the plurality of multiplexers either the first or second digital image value responsive to the bit value, $\alpha_i$, of the digital value $\alpha$. Each of the outputs of the plurality of multiplexers is shifted left according to the order of the bit values, $\alpha_i$, of $\alpha$ to produce a plurality of left-shifted outputs. The adder is configured to receive the plurality of left-shifted outputs and is further configured to produce the sum of the left-shifted outputs.

In another embodiment of the invention, an apparatus is disclosed for performing alpha blending calculations on a first digital image value and a second digital image value according to a digital alpha ($\alpha$) value. The $\alpha$ value has a fractional part of n digits, a most significant bit of $\alpha_1$, and a least significant bit of $\alpha_{n-1}$, wherein the order of $\alpha_i$ is related to i. The apparatus comprises a plurality of multiplexers and an adder. Each of the plurality of multiplexers is configured to receive a bit value, $\alpha_i$, of the digital value $\alpha$. Moreover, each of the plurality of multiplexers is configured to receive first and second left-shifted digital image values. The first and second left-shifted digital image values are shifted left according to the order of the bit values, $\alpha i$, of $\alpha$. Still further, each of the plurality of multiplexers is configured to produce a plurality of left-shifted outputs by directing to outputs of the plurality of multiplexers either the first or second left-shifted digital image value responsive to the bit value, $\alpha_i$, of $\alpha$. The adder is configured to receive the plurality of left-shifted outputs and is further configured to produce the sum of the left-shifted outputs.

In another embodiment of the invention, the adder is a carry save adder. In yet another embodiment of the invention, the first digital image value is represented using a first number of bits and the second digital image value is represented using a second number of bits. Moreover, the sum of the left-shifted outputs is represented using a third number of bits and the third number of bits is greater than or equal to the sum of the first number and the second number plus one. In another embodiment of the invention, a shift register produces the left-shifted outputs. And in yet another embodiment, the left-shifted outputs are produced by a shifted coupling of outputs of the plurality of multiplexers to inputs of the adder.

Another embodiment of the invention is described as a method for performing alpha blending calculations on a first digital image value X and a second digital image value Y according to a digital alpha ($\alpha$) value. The $\alpha$ value has a fractional part of n digits and has a most significant bit of $\alpha_1$ and a least significant bit of $\alpha_{n-1}$, and the order of a $\alpha_i$, is related to i. In the method of the invention, first and second digital image values are received as well as $\alpha$ value. The method then selects either the first or second digital value responsive to the bit value, $\alpha_i$ of $\alpha$ to produce a selected digital value. The selected digital value is then shifted left according to the order of the bit values, $\alpha_i$ of $\alpha$ to generate a plurality of left shifted digital values. The plurality of left-shifted digital values are then added to generate a result, R.

In another embodiment of the invention, the first digital image value is represented using a first number of bits and the second digital image value is represented using a second number of bits. Also, the sum of the left-shifted outputs can be represented using a third number of bits. In an embodiment, the third number of bits is greater than or equal to the sum of the first number and the second number plus one. In another embodiment, the first and second left-shifted digital image values are produced by computer controlled bit operations. Also, the adding step can be performed using a hardware-implemented adder.

Many other embodiments or variations are possible as will be appreciated upon an understanding of the present disclosure.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Figure 1A:
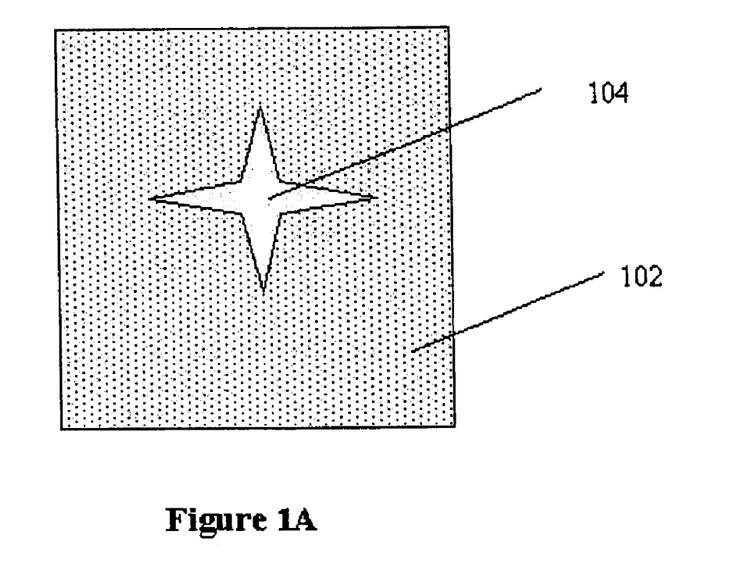
FIGS. 1A through 1C illustrate how alpha blending is used to blend at least two different images on one display according to an embodiment of the invention.
Figure 1B:
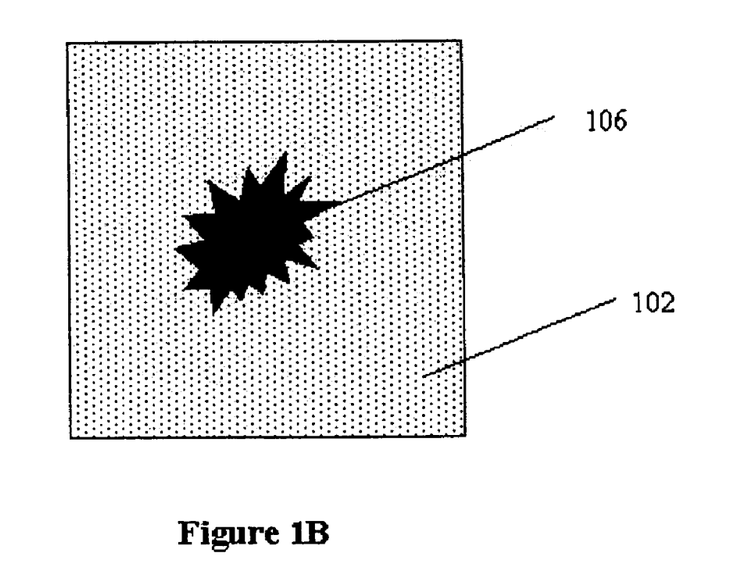

In order to fully understand the present invention, it is important to understand the concept of alpha blending. Shown in FIG. 1A is an image 104 over a background 102. Note that image 104 is in the shape of a four-pointed star with an opaque white (or generally light) color such that the background 102 located behind image 104 is not visible. Shown in FIG. 1B is an image 106 over a similar background 102. Here, note that image 106 is in the shape of a many-pointed blot with an opaque black (or generally dark) color such that the background 102 is not visible. There can be many applications where either image 104 or image 106 are desired to be displayed, however, there are the further applications where a mix or blend of images is desired.

Figure 1C:
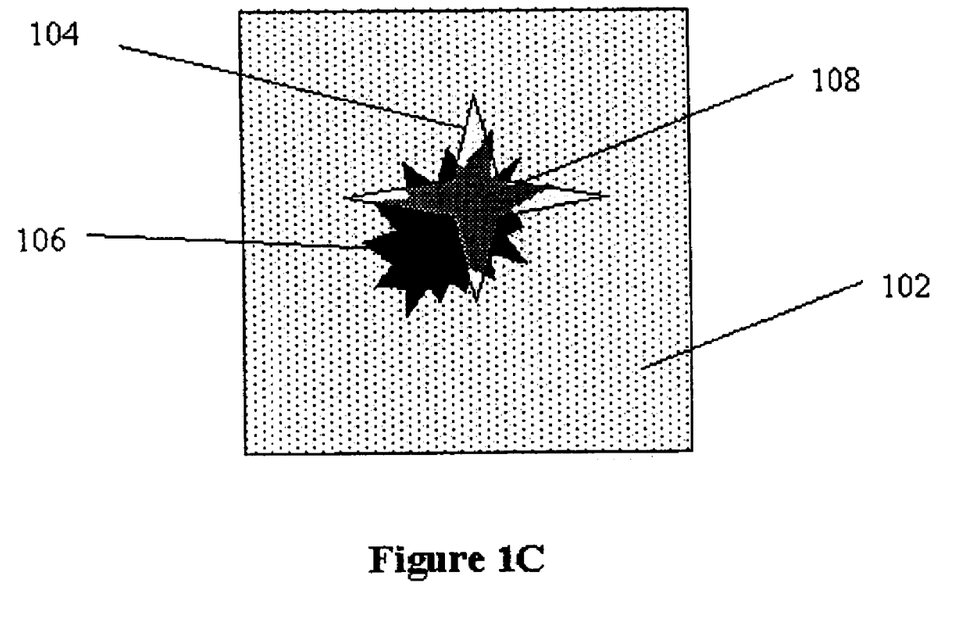

Shown in FIG. 1C is the condition with a blend of both image 104 and image 106. Area 108 is of particularly interest because it is in this area where image 104 and image 106 intersect and it is this area in which individual pixels on a screen must be mixed. Area 108 is thus a result of blending part of image 104 with part of image 106. In a particular example, area 108 can be displayed as a contribution of half from image 104 and half from image 106. As will be discussed below, this can be achieved through alpha blending with a condition where $\alpha=0.5$. Thus, the resulting area 108 as a blend of opaque white and opaque black produces an area 108 that is gray in color.

In graphics applications, a resulting pixel value, R (e.g., a pixel from within area 108), is produced from a blend of a first pixel value, X (e.g., a pixel from image 104), and a second pixel value, Y (e.g., a pixel form image 106), through the use of the following equation:

$$R=\alpha X+(1-\alpha)Y$$

where $\alpha$ is a number ranging from 0 to 1. From this linear equation, it can be seen that where $\alpha=1$, the resulting pixel value is the same as the first pixel value (i.e., R=X, when $\alpha=1$); it is also seen that where $\alpha=0$, the resulting pixel value is the same as the second pixel value (i.e., R=Y, when $\alpha=0$). It can also be seen that where $\alpha=0.5$, the resulting pixel value is a blend of both images (i.e., R=0.5X+0.5Y. This is the condition shown for area 108 of FIG. 1C. Many intermediate results can be achieved by ranging $\alpha$ from 0 to 1.

Many graphic systems are implemented on digital computers where information including graphical information is communicated in binary format. Thus, information is represented as collections of ones and zeros. Moreover, mathematical calculations are performed using a binary counting system. In order to fully appreciate the present invention, it is important to understand how the prior art performed alpha blending calculations.

Figure 2A:
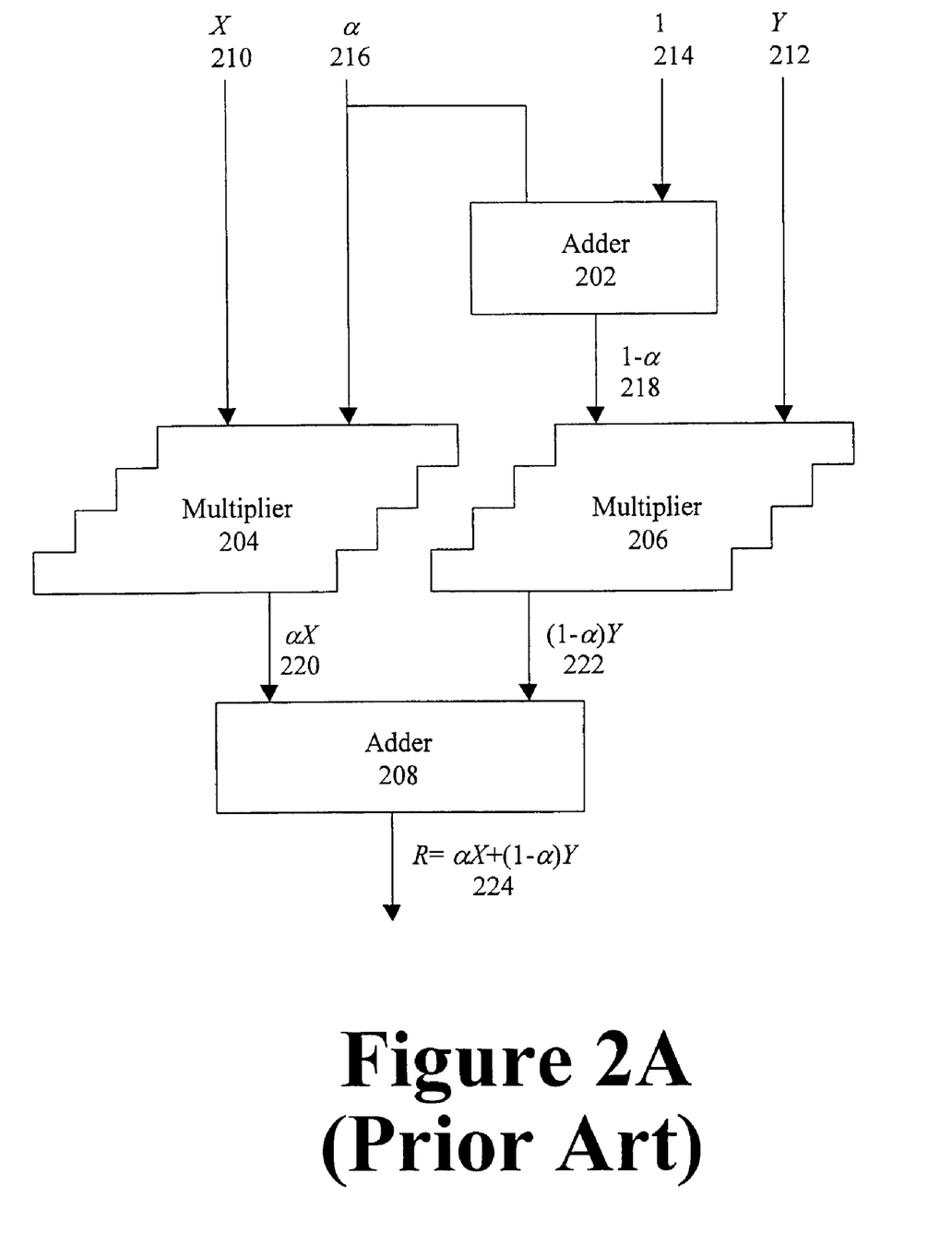
FIG. 2A is a block diagram representation of an implementation for performing alpha blending calculations using two adders and two multipliers according to the prior art.

Shown in FIG. 2A is a prior art implementation where the alpha blending calculation is achieved through the use of two multipliers (i.e., multiplier 204 and multiplier 206) and two adders (i.e., adder 202 and adder 208). As shown, digital information for $\alpha$ at input 216 is provided to adder 202. Also input to adder 202 is a digital value for the number 1 at input 214. Using techniques known in the art, a result $1-\alpha$ is generated at output 218 of adder 202. Note that, as known in the art, an adder is used to generate a difference, for example by first negating the value $\alpha$. The output 218 and a digital value for Y at input 212 is then provided to multiplier 206 to generate the quantity $(1-\alpha)Y$ at output 222. Input to a second multiplier 204 are digital values for X at input 210 and $\alpha$ at input 216 used to generate the value $\alpha X$ at output 220. The values $\alpha X$ and $(1-\alpha)Y$ are then added by adder 208 to generate the result $R=\alpha X+(1-\alpha)Y$ at output 224.

Figure 2B:
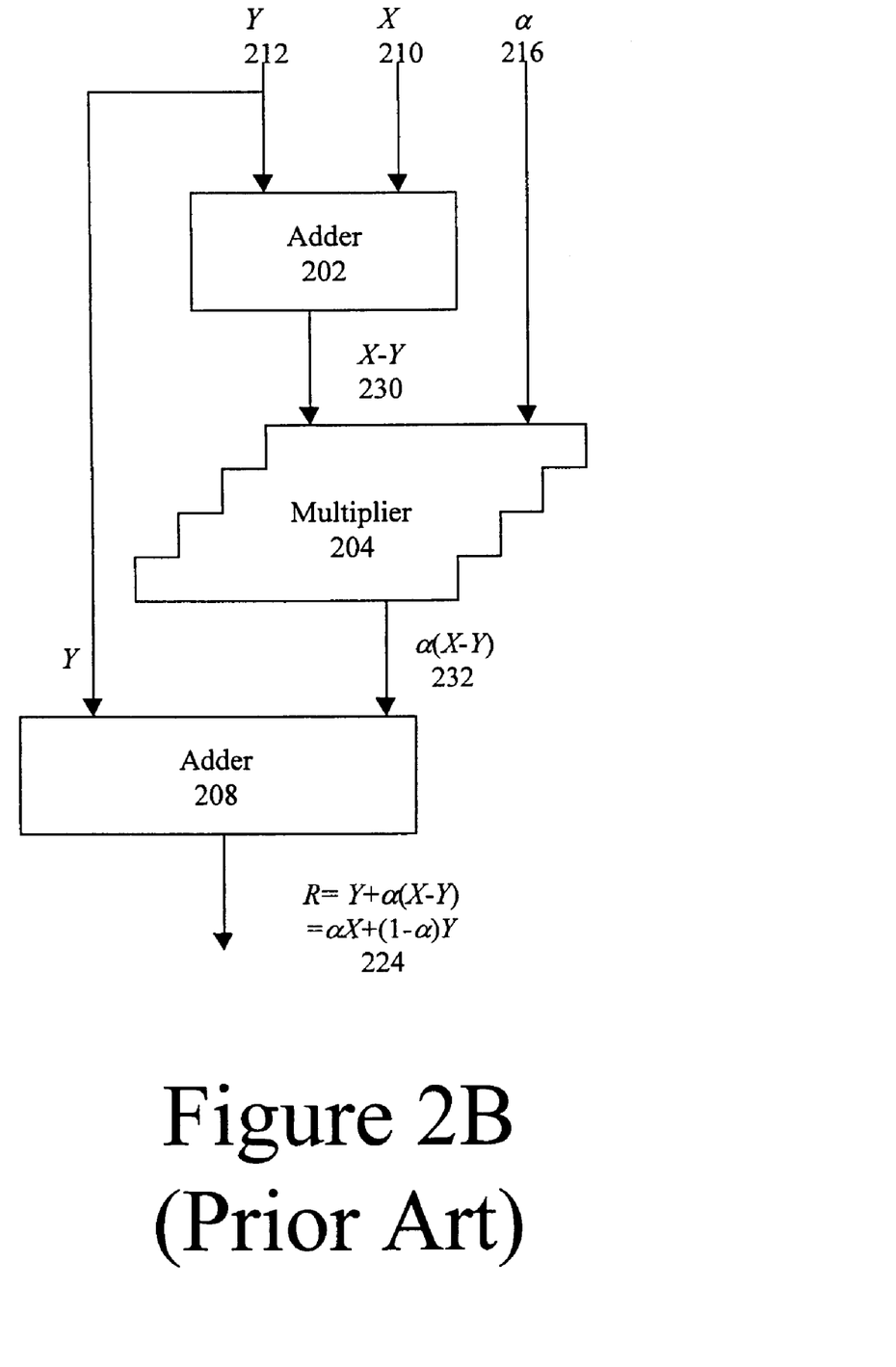
FIG. 2B is a block diagram representation of an implementation for performing alpha blending calculations using two adders and one multiplier according to the prior art.

Shown in FIG. 2B is another prior art implementation for performing alpha blending calculations. As shown, adder 202 is used to generate the quantity X−Y at output 230. Using multiplier 204, the quantity X−Y is multiplied with $\alpha$ to generate the quantity $\alpha(X-Y)$ at output 232. Adder 208 is then used to add the quantity $\alpha(X-1)$ to the value Y. The result $R=\alpha X+(1-\alpha)Y$ is then generated at output 224. In either the prior art implementation of FIG. 2A or 2B, the multipliers (e.g., 204 or 206) take up a large amount of area on an integrated circuit. Furthermore, the adders (e.g., 202 or 208) introduce significant delays in generating an output. Thus, the combinations of multipliers and adders take up a large amount of area and introduce significant delays in generating alpha blending calculations.

Whereas prior art implementations such as those shown in FIGS. 2A an 2B, use straightforward mathematical implementations, the present invention uses particular characteristics of the digital value $\alpha$ and $\overline{\alpha}$ to reduce the amount of integrated circuit area used and the amount of time needed to generate an alpha blending calculation. Toward understanding the present invention, characteristics of $\alpha$ and $\overline{\alpha}$ will be discussed as they relate to alpha blending.

Given a positive number $\alpha$ in base r with an integer part of m digits and a fraction part of n digits, the (r−1)'s complement of $\alpha$ is defined as $$\overline{\alpha}=r^m-r^{-n}-\alpha.$$

We can apply this to the particular case where r=2 (i.e., a binary or digital system), an integer part of zero digits and a fraction part of n digits. Thus, the 1's complement of α is defined as $$\bar{\alpha}=1-r^{-n}-\alpha.$$

Rewriting this result, we have $$\bar{\alpha}=(1-\alpha)-r^{-n}.$$

For n of sufficient size, it is observed that the term $r^{-n}$ becomes very small such that the 1's complement of α is approximated as $$\bar{\alpha}\approx(1-\alpha).$$

Whereas the calculation of the 1's complement can be mathematically complex, in actual implementation, the 1's complement is achieved by simply reversing each bit of a digital number. For example, for the digital number α=0.01101001 (i.e., α=0.41015625 in base 10), the 1's complement is achieved by simply reversing each bit resulting in the 1's complement $\bar{\alpha}$=0.10010110 (i.e., $\bar{\alpha}$=0.5859375 in base 10; note that for the purposes of the present disclosure, leading zeros will be omitted when referring to digital numbers if no bit is present to represent the leading zero). We see that $\bar{\alpha}$=0.5859375 closely approximates the true value of 1−α=0.58984375 where the difference is equal to $2^{-8}$=0.00390625. Thus, because the complement of α can be easily obtained, so can an approximation of the quantity 1−α. A fast and efficient manner for calculating the quantity (1−α) is developed from this approximation. Moreover, a fast and efficient manner for performing alpha blending is developed.

Recall that the alpha blending calculation takes two quantities X and Y and blends them together according to a value α to produce a mixed value R according to the equation:

$$R=\alpha X+(1-\alpha)Y.$$

From the approximation for $\bar{\alpha}$, we obtain an estimate for the value R:

$$R\approx\alpha X+\bar{\alpha}Y$$

where $\bar{\alpha}\approx(1-\alpha)$.

We can therefore rewrite the equation for R as $$R \approx \left(\sum_{i=0}^{n-1} \alpha_i 2^{-i-1}\right)X + \left(\sum_{i=0}^{n-1} \bar{\alpha}_i 2^{-i-1}\right)Y = \sum_{i=0}^{n-1} R_i$$

Where $\alpha_1$ (sometimes also written as $\alpha(1)$) is the most significant bit (MSB) of α, $\alpha_{n-1}$ (sometimes also written as $\alpha(n-1)$ is the least significant bit (LSB) of α

$\bar{\alpha}_1$ (sometimes also written as $\bar{\alpha}(1)$) is the MSB of $\bar{\alpha}$, $\bar{\alpha}_{n-1}$ (sometimes also written as $\bar{\alpha}(n-1)$) is the LSB of $\bar{\alpha}$; and $R_i$ is a partial sum corresponding to $\alpha_i$ or $\bar{\alpha}_i$ From the approximation for R above, the number i corresponds in a known way to the order of the bit value $\alpha_i$. Consider, for example, the partial sum $$R_i=\alpha_i 2^{-i-1}X+\bar{\alpha}_i 2^{-i-1}Y$$

where i=2, $\alpha_2$=1 and $\bar{\alpha}_2$=0 such that we have the following partial sum $$R_2 = \alpha_2 \cdot 2^{-3} \cdot X + \bar{\alpha}_2 \cdot 2^{-3} \cdot Y$$
$$= 1 \cdot 2^{-3} \cdot X + 0 \cdot 2^{-3} \cdot Y$$
$$= 2^{-3} \cdot X.$$

Now consider, for example, the condition where i=3, $\alpha_3$=0, and $\bar{\alpha}_3$=1 such that we have the following partial sum $$R_3 = \alpha_3 \cdot 2^{-4} \cdot X + \bar{\alpha}_3 \cdot 2^{-4} \cdot Y$$
$$= 0 \cdot 2^{-4} \cdot X + 1 \cdot 2^{-4} \cdot Y$$
$$= 2^{-4} \cdot Y.$$

It is, therefore, observed that the result R is obtained as the sum of left-shifted digital quantities of the quantities X and Y, where the quantities X and Y are left-shifted according to the order of the corresponding bit of α or $\bar{\alpha}$, respectively. Because the quantities α or $\bar{\alpha}$ are complements of each other, it is further observed that any partial sum, $R_i$ is obtained from either a shifted quantity of X or Y, but not both.

An example will assist in understanding the concepts just described. Assume that X and Y are 8-bit numbers. For the purposes of clarity the subscript 8 (i.e., $X_8$ and $Y_8$) will be used to remind the reader that these are 8-bit values; moreover, the subscript 8 will be used with the value zero (i.e., $0_8$) to denote an 8-bit zero value. Assume that α is an eight-bit number less than 1 and greater than or equal to zero such that $\bar{\alpha}$ is also less than 1 and greater than or equal to zero. In proceeding, specific values of α or $\bar{\alpha}$ will be used to illustrate key features of the present invention, but one of skill in the art will understand its broad implications. If α=0.01101001, then $\bar{\alpha}$=0.1010110. The product $\alpha\cdot X_8$ is, therefore, conceptually obtained as follows:

$\alpha \cdot X_8 \Rightarrow$

| x | 0 | 1 | 1 | 0 | 1 | 0 | 0 | 1 |
|---|---|---|---|---|---|---|---|---|
|   |   |   |   |   |   |   |   | $X_8$ |
|   |   |   |   |   |   |   | $X_8$ |   |
|   |   |   |   |   |   | $0_8$ |   |   |
|   |   |   |   |   | $0_8$ |   |   |   |
|   |   |   |   | $X_8$ |   |   |   |   |
|   |   |   | $0_8$ |   |   |   |   |   |
|   |   | $X_8$ |   |   |   |   |   |   |
|   | $0_8$ |   |   |   |   |   |   |   |
| $0_{8,L7}$ + | $X_{8,L6}$ + | $X_{8,L5}$ + | $0_{8,L4}$ + | $X_{8,L3}$ + | $0_{8,L2}$ + | $0_{8,L1}$ + | $X_{8,L0}$ |

Note that in this result, $0_{8,L7}+X_{8,L6}+X_{8,L5}+0_{8,L4}+X_{8,L3}+0_{8,L2}+0_{8,L1}+X_{8,L0}$, the subscript Lx has been included to denote the number of left shifts associated with a value (e.g., L7 indicates a left shift of 7 bits). Thus, to obtain the product $\alpha\cdot X_8$ requires shifting of the value $X_8$ according to the digital representation of α. Where a 1 is present in the digital value $\alpha_i$, the digital value $X_8$ is shifted left according to the order of $\alpha_i$ such that the final product $\alpha\cdot X_8$ is the sum of all the shifted values; zero values do not add to the complexity of the present calculation, but are included here as place holders toward obtaining a final solution. Placement of the decimal point must account for the fractional number α and the fractional part of the value $X_8$ as is known to those of skill in the art. Similarly, with the 1's complement of α, the product $\overline{\alpha} \cdot Y_8$ is obtained as follows $$\overline{\alpha} \cdot X_8 \Rightarrow$$

$$\begin{array}{c|cccccccc}
 & 1 & 0 & 0 & 1 & 0 & 1 & 1 & 0 \\
\hline
x & & & & & & & & Y_8 \\
 & & & & & & & 0_8 & \\
 & & & & & & Y_8 & & \\
 & & & & & Y_8 & & & \\
 & & & & 0_8 & & & & \\
 & & & Y_8 & & & & & \\
 & & 0_8 & & & & & & \\
 & 0_8 & & & & & & & \\
Y_8 & & & & & & & & \\
\hline
Y_{8,L7} + & 0_{8,L6} + & 0_{8,L5} + & Y_{8,L4} + & 0_{8,L3} + & Y_{8,L2} + & Y_{8,L1} + & 0_{8,L0}
\end{array}$$

The quantity R can, therefore, be obtained by adding these calculated values:

$$R \Rightarrow \frac{\begin{array}{cccccccc} 0_{8,L7} + & X_{8,L6} + & X_{8,L5} + & 0_{8,L4} + & X_{8,L3} + & 0_{8,L2} + & 0_{8,L1} + & X_{8,L0} \\ Y_{8,L7} + & 0_{8,L6} + & 0_{8,L5} + & Y_{8,L4} + & 0_{8,L3} + & Y_{8,L2} + & Y_{8,L1} + & 0_{8,L0} \end{array}}{Y_{8,L7} + \; X_{8,L6} + \; X_{8,L5} + \; Y_{8,L4} + \; X_{8,L3} + \; Y_{8,L2} + \; Y_{8,L1} + \; X_{8,L0}}$$

Observe that the values of $X_{8,Ly}$ and $Y_{8,Ly}$ (where y is a value between 0 and 7) are never added to each other such that only one or the other of the shifted values, $X_{8,Ly}$ and $Y_{8,Ly}$, can be input to an adder to calculate the resulting sum. The adder used in such a function would need to account for possible carries of the resulting sum, $Y_{8,L7}+X_{8,L6}+X_{8,L5}+Y_{8,L4}+X_{8,L3}+Y_{8,L2}+Y_{8,L1}+X_{8,L0}$ It is further observed that an approximate value for R can be obtained by selecting either X or Y according to the digital representation of α, shifting the selected value according to the order of $α_i$ and then adding the selected and shifted quantities (note that here no subscripts are used on X and Y because the more general case is being discussed).

Figure 3:
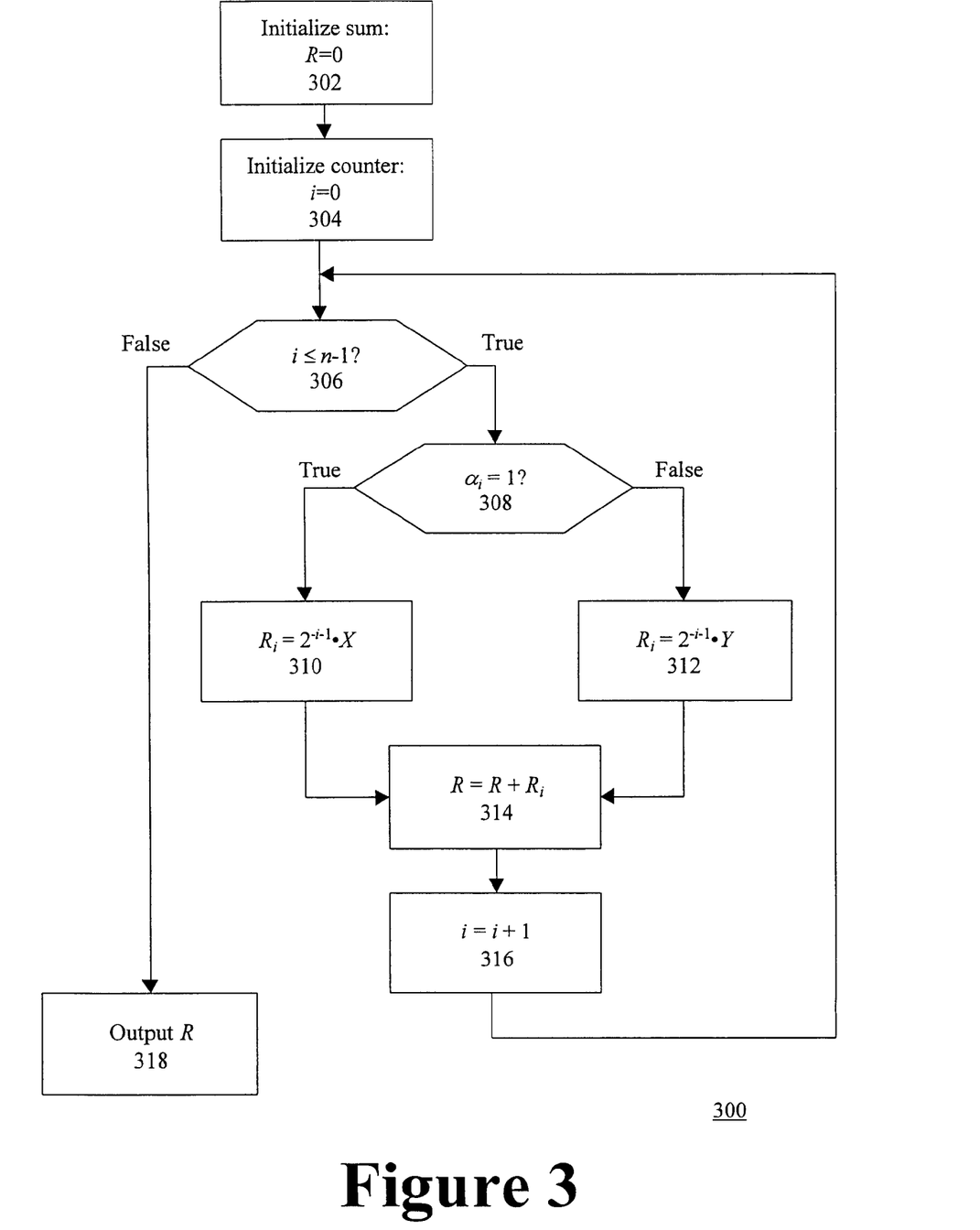
FIG. 3 is a flowchart representation of a method for performing alpha blending calculations according to the present invention.

Shown in FIG. 3 is a flowchart corresponding to a method 300 of the present invention implementing the observations described above. To assure that values are properly controlled in method 300, a result value, R, of n digits is initialized at step 302 and a counter, i, is initialized at step 304. A query is then made at step 306 as to whether or not the present value of the counter, i, is less than or equal to the value n−1. In a first pass of the method 300 with n greater than or equal to 1, step 306 would yield a TRUE condition. A query would then be made as to whether or not the $i^{th}$ bit of α is equal to 1 (i.e., $α_i=1$?) at step 308. Where step 308 yields a TRUE condition, step 310 is executed. At step 310, an intermediate value $R_i$ is generated equal to the value $2^{-i-1} \cdot X$. Where step 308 yields a FALSE condition (i.e., $α_i=0$, that is, $\overline{α}_i=1$), step 312 is executed. At step 312, an intermediate value $R_i$ is generated equal to the value $2^{-i-1} \cdot Y$. After the execution of either step 310 or 312, the step 314 is executed where a new value for the result, R, is obtained by adding the intermediate value, $R_i$, obtained in either step 310 or 312. Step 314 is not a general addition, but is rather an addition as would be computed by computer in implementing a programming language such as C or C++. The counter, i, is then incremented at step 316 after which the query of step 306 is again made. When the query of step 306 yields a FALSE condition, a final result is obtained as the value R at step 318. One of skill in the art will understand that improvements can be made of method 300 without deviating from the general method described. For example, step 314 can be absorbed into steps 310 and 312 such that an intermediate result, $R_i$, need not be generated. Furthermore, the counter, i, can be implemented in more efficient manners as known to one of skill in the art.

Figure 4A:
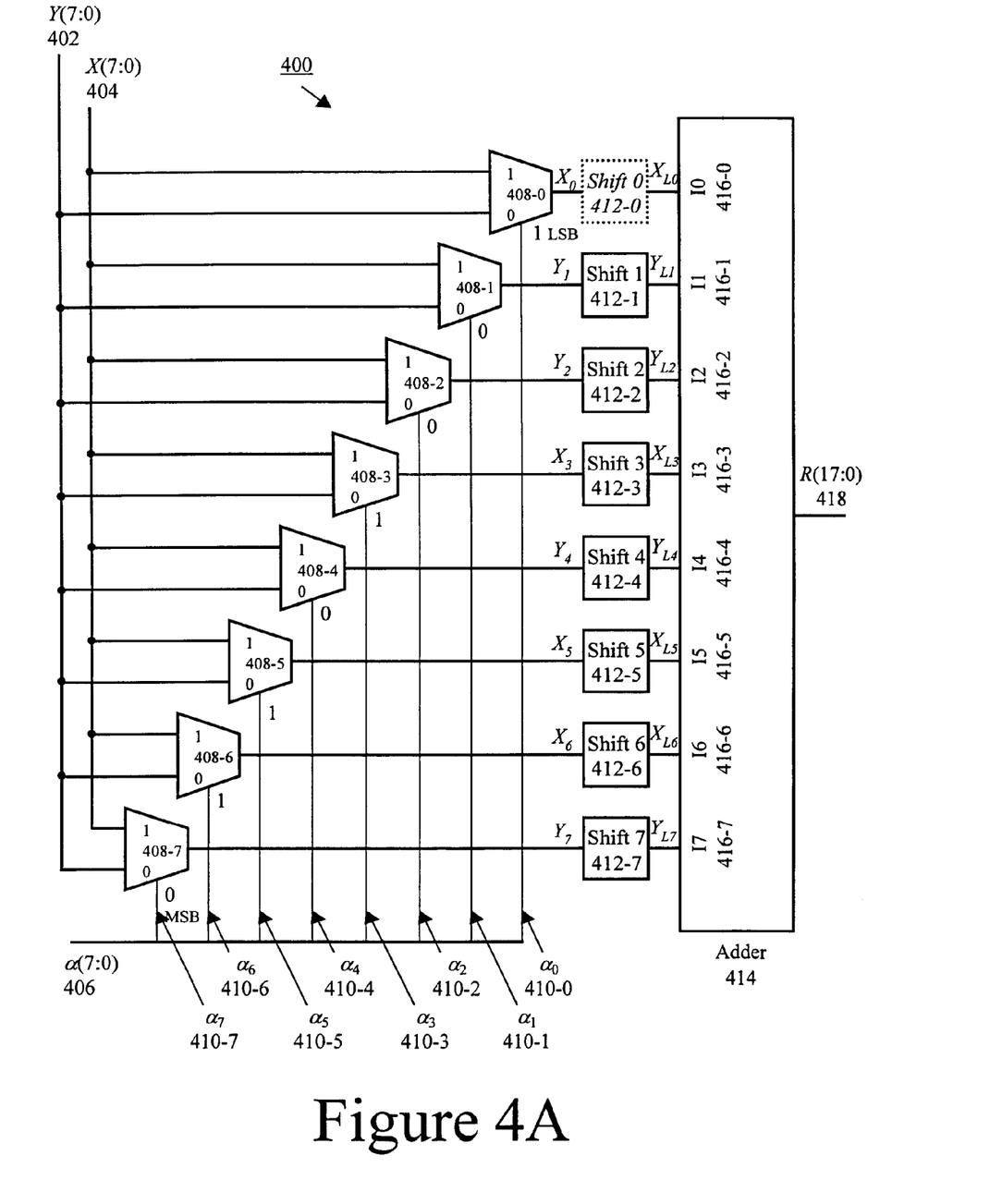
FIG. 4A is a block diagram representation of an apparatus for performing alpha blending calculations according to the present invention.

The method 300 of FIG. 3 lends itself to implementation in a digital computer; however, method 300 can also be implemented in hardware for fast and cost-effective computation of alpha blending calculations. A block diagram of a hardware implementation is shown in FIG. 4A. Shown in FIG. 4A is an implementation wherein the values X at 404, Y at 402, and a are eight-bit binary numbers. With the present disclosure, however, one of skill in the art will understand the more general applicability of FIG. 4A. As shown in FIG. 4A, the values X and Y are directed to the inputs of multiplexers 408-0 through 408-7. Here, note that the eight-bit values for X and Y are directed to the inputs of each of the multiplexers 408-0 through 408-7. As further shown in FIG. 4A, the various bits of the value α are directed to the select lines of multiplexers 408-0 through 408-7. The least significant bit of α, $α_o$, is directed to multiplexer 408-0 and the most significant bit of α, $α_7$, is directed to multiplexer 408-7. Intermediate bits of a are similarly directed to corresponding multiplexers. Thus, the bits of α are used to select from the eight-bit values X or Y. Where a bit of $α_i=1$, the value X is selected; where a bit of $α_i=0$ corresponding to a bit of $\overline{α}_i=1$, the value Y is selected.

Recall that various left shifts of X and Y were required to obtain the value $R=αX+\overline{α}Y$. Left shift units 412-0 through 412-7 provide this shifting function. In actual implementation, left shift unit 412-0 can be omitted, as no shift is required. It is nonetheless included so as to highlight the symmetry of implementation. In an embodiment of the invention, left shift units 412-0 through 4127 are shift registers. It is further noted that the function of left shift units 412-0 through 412-7 can be readily implemented in various ways without introducing a separate device. For example, shifting a value left can be achieved through wiring a device with shifted inputs or outputs. Moreover, where a digital computer is in use, the digital computer can readily provide shifted values of either X or Y The outputs of left shift units 412-0 through 412-7 are then directed to adder 414. One of skill in the art will understand that adder 414 can be implemented in many forms. In an embodiment of the invention, adder 414 is implemented as a carry-save adder (CSA). The output at 418 of adder 414 is therefore the desired result, R. In the embodiment being described, adder 414 provides 17 bit lines to represent the result R.

To further highlight features of the present invention, FIG. 4A will now be described as a continuation of the previously-described example where a=0.01101001 and $\overline{α}$=0.10010110. The bit values of α are directed to the select lines of multiplexers 408-0 through 408-7 with the most significant bit (MSB) of α directed to the select line of multiplexer 408-7 and the least significant bit (LSB) of α directed to the select line of multiplexer 408-0. With α=0.01101001, the outputs of multiplexers 408-7 through 408-0 are respectively Y, X, X, Y, X, Y, Y, and X. Accordingly, the output of multiplexer 408-7 (i.e., Y) is shifted left 7 bits to generate $Y_{L7}$, the output of multiplexer 408-6 (i.e., A) is shifted left 6 bits to generate $X_{L6}$, the output of multiplexer 408-5 (i.e., A) is shifted left 5 bits to generate $X_{L5}$, the output of multiplexer 408-4 (i.e., Y) is shifted left 4 bits to generate $Y_{L4}$, the output of multiplexer 408-3 (i.e., X) is shifted left 3 bits to generate $X_{L3}$ the output of multiplexer 408-2 (i.e., Y) is shifted left 2 bits to generate $Y_{L2}$, the output of multiplexer 408-1 (i.e., Y) is shifted left 1 bit to generate $Y_{L1}$, and the output of multiplexer 408-0 (i.e., X) is shifted left 0 bits, i.e., no shifting is necessary, to generate $X_{L0}$. These shifted values are then directed to the inputs 416-7 through 416-0, respectively, of adder 414 that produces the result R at output 418. Note that for eight-bit values for X and Y require 17 bits at the output R.

Figure 4B:
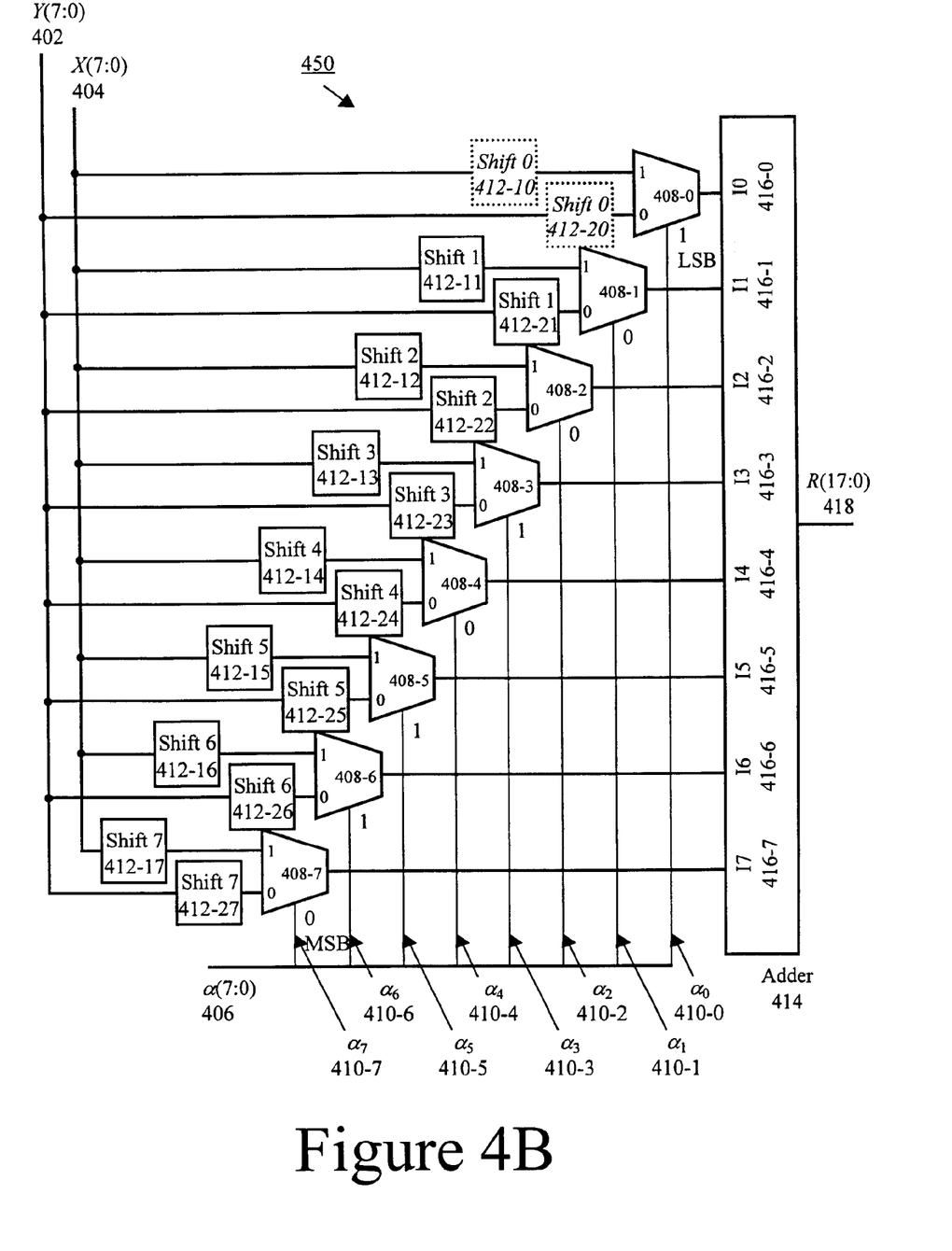
FIG. 4B is a block diagram representation of an apparatus for performing alpha blending calculations according to the present invention.

Another embodiment of the present invention is shown in FIG. 4B. Many of the features of FIG. 4B are similar to that of FIG. 4A, except that values of X and Y are shifted prior to being input to multiplexers 408-0 through 408-1. In FIG. 4B, two left shift units are associated with each multiplexer 408-0 through 408-7. Upon selection of by the appropriate bit value of α the correctly shifted values of either X or Y are directed to inputs 416-0 through 416-7 of adder 414. As described with reference to FIG. 4A, adder 414 can be implemented by various types of adders including, for example, a carry save adder (CSA). The result R at output 418 is thus the correct result for the alpha blending calculation.

It is noted that implementations of the present invention shown in FIGS. 4A and 4B use much less area and are much faster than the prior art implementations shown in FIGS. 2A and 2B. Importantly, multiplexers 408-0 through 408-7 take up very little chip area and introduce very little latency. Adder 414 is more complex than adders 202 and 208 of FIG. 2. In fact, adder 414 is of the order of a prior art multiplier such as multipliers 204 and 206; however, the latency of adder 414 is still approximately the same as prior art adders such as adders 202 and 208. Thus as a whole, the present invention provides alpha blending calculations using chip area on the order of one prior art multiplier and a latency of one prior art adder.

The foregoing descriptions of specific embodiments of the present invention have been presented for purposes of illustration and description. They are not intended to be exhaustive or to limit the invention to the precise forms disclosed. Many modifications and variations are possible in light of the above teachings without deviation from the scope of the claims set out below. The embodiments were chosen and described in order to best explain the principles of the invention and its practical application, to thereby enable others skilled in the art to best utilize the invention and various embodiments with various modifications as are suited to the particular use contemplated.

What is claimed is:

1. An apparatus for performing alpha blending calculations on a first digital image value and a second digital image value according to a digital alpha (α) value having a fractional part of n digits and having a most significant bit of $\alpha_1$ and a least significant bit of $\alpha_{n-1}$, and wherein the order of $\alpha_i$ is related to an $i^{th}$ digit of α, comprising:
   a plurality of multiplexers,
      each of the plurality of multiplexers configured to receive a bit value, $\alpha_i$, of the digital value α,
      each of the plurality of multiplexers configured to receive first and second left-shifted digital image values, the first and second left-shifted digital image values shifted left according to the order of the bit values, $\alpha_i$, of α,
      each of the plurality of multiplexers configured to produce a plurality of left-shifted outputs by directing to outputs of the plurality of multiplexers either the first or second left-shifted digital image value responsive to the bit value, $\alpha_i$, of α; and
   an adder configured to receive the plurality of left-shifted outputs and further configured to produce the sum of the left-shifted outputs.

2. The apparatus of claim 1, wherein the adder is a carry save adder.

3. The apparatus of claim 1, wherein the first digital image value is represented using a first number of bits and the second digital image value is represented using a second number of bits.

4. The apparatus of claim 3, wherein the sum of the left-shifted outputs is represented using a third number of bits.

5. The apparatus of claim 4, wherein the third number of bits is greater than or equal to the sum of the first number and the second number plus one.

6. The apparatus of claim 1, wherein the first and second left-shifted digital image values are produced by a shift register.

7. The apparatus of claim 1, wherein the left-shifted outputs are produced by a shifted coupling of inputs of the plurality of multiplexers.

* * * * *

UNITED STATES PATENT AND TRADEMARK OFFICE
CERTIFICATE OF CORRECTION

PATENT NO. : 7,200,283 B2
APPLICATION NO. : 11/382682
DATED : April 3, 2007
INVENTOR(S) : Jin-Ming Gu It is certified that error appears in the above-identified patent and that said Letters Patent is hereby corrected as shown below:

Title Pg, Item (73) assignee please replace "VIA Technologies, Inc." with "S3 Graphics Co., Ltd."

Signed and Sealed this
Twenty-seventh Day of September, 2011

David J. Kappos
*Director of the United States Patent and Trademark Office*